US006588870B2

(12) United States Patent
Aruga et al.

(10) Patent No.: US 6,588,870 B2
(45) Date of Patent: Jul. 8, 2003

(54) METHOD OF MANAGING PRODUCTION OF PRINTING SYSTEMS AND SUPPLY OF EXPENDABLES

(75) Inventors: Shuichi Aruga, Nagano-ken (JP); Ryohei Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/986,177

(22) Filed: Nov. 7, 2001

(65) Prior Publication Data

US 2002/0047871 A1 Apr. 25, 2002

Related U.S. Application Data

(63) Continuation of application No. PCT/JP01/01731, filed on Mar. 6, 2001, now abandoned.

(30) Foreign Application Priority Data

Mar. 7, 2000 (JP) .................................... 2000-062600
Feb. 9, 2001 (JP) .................................... 2001-033692

(51) Int. Cl.$^7$ ................................................ B41J 29/38
(52) U.S. Cl. ................................................ 347/5
(58) Field of Search .............................. 347/5, 14, 19, 347/6, 86, 7, 85, 23, 106; 358/400, 296; 399/106

(56) References Cited

U.S. PATENT DOCUMENTS 5,262,872 A * 11/1993 Yoshimura et al. ......... 358/296
6,027,200 A * 2/2000 Takahashi et al. ........... 347/19

FOREIGN PATENT DOCUMENTS

| JP | 8-2117920 | 8/1996 | .......... G03G/21/00 |
| JP | 8-249140 | 9/1996 | .......... G06F/3/12 |
| JP | 9-91499 | 4/1997 | .......... G07D/13/00 |
| JP | 9-160452 | 6/1997 | .......... G03G/21/02 |
| JP | 9-188042 | 7/1997 | .......... B41J/29/38 |
| JP | 9-240014 | 9/1997 | .......... B41J/2/175 |
| JP | 11-309878 | 11/1999 | .......... B41J/2/175 |
| JP | 2000-19906 | 1/2000 | .......... G03G/21/02 |

OTHER PUBLICATIONS

Patent Abstract of Japan 08–249140, Sep. 27, 1996.
Patent Abstract of Japan 09–188042, Jul. 22, 1997.
Patent Abstract of Japan 09–091499, Apr. 4, 1997.
Patent Abstract of Japan 09–160452, Jun. 20, 1997.
Patent Abstract of Japan 2000–019906, Feb. 21, 2000.
Patent Abstract of Japan 08–211792, Aug. 20, 1996.
Patent Abstract of Japan 11–309878, Nov. 9, 1999.
Patent Abstract of Japan 09–240014, Sep. 16, 1997.

* cited by examiner

*Primary Examiner*—Raquel Yvette Gordon
*Assistant Examiner*—Charles W. Stewart, Jr.
(74) *Attorney, Agent, or Firm*—Sughrue Mion, PLLC (57) ABSTRACT

A system construction section 24 receives mechanical modules, such as printer modules, and a scanner, produced by a mechanicals expendables production section 22, and assembles the mechanical modules and a built-in computer for driving and controlling the mechanical modules, so as to construct a printing system. Constructed printing systems 132, 134, and 136 are installed in a mini-labo 32, a drugstore 34, and a shopping mall 36. An expendables supply section 26 obtains a supply of expendables, which have been consumed in the respective printing systems 132, 134, and 136, from a mechanicals expendables production section 22. The supply of expendables from the mechanicals expendables production section 22, which produces genuine expendables suitable for the printer modules, ensures sufficient execution of the printing performances of the printing system.

18 Claims, 7 Drawing Sheets

METHOD OF MANAGING PRODUCTION OF PRINTING SYSTEMS AND SUPPLY OF EXPENDABLES

CROSS-REFERENCE TO RELATED APPLICATION

This is a continuation of Application PCT/JP01/01731, filed Mar. 6, 2001, now abandoned.

BACKGROUND OF THE INVENTION

1. Field of the Invention

The present invention relates to method of managing production of printing systems and supply of expendables. More specifically the invention pertains to a method of managing production of printing systems, each including an ink jet printer and a computer, and supply of expendables.

2. Description of the Prior Art

For supply of expendables, such as ink and paper for printing, in an ink jet printer, the user who bought or rents the ink jet printer conventionally purchases the expendables specified by the manufacturer of the ink jet printer or compatible expendables.

In the case of high-performance ink jet printers, however, the compatible expendables may not ensure sufficient execution of performances of the ink jet printer. This drawback is remarkable in a printing system for business use, in which multiple ink jet printer modules are incorporated. Careful management is also required in the printing system for business use, in order to assure timely supply of expendables.

The method of managing production of printing systems and supply of expendables according to the present invention aims to construct a system that ensures sufficient practice of performances of an ink jet printer. The method of managing production of printing systems and supply of expendables according to the present invention also aims to adequately supply expendables, in order to ensure sufficient execution of the performances of the ink jet printer. The method of managing production of printing systems and supply of expendables according to the present invention still aims to rationalize management of supply of the expendables.

SUMMARY OF THE INVENTION

In order to attain at least part of the above and the other related objects, the method of managing production of printing systems and supply of expendables according to the present invention has the following arrangement.

The present invention is thus directed to a method of managing production of a printing system, which includes an ink jet printer and a computer, and supply of expendables. The method includes the steps of: (a) causing a system construction section to construct the printing system by assembling at least one printer module supplied from a modules expendables production section, which produces a printer module including at least a head of the ink jet printer and expendables consumed by the printer module, and a computer that controls a printing operation of the at least one printer module; (b) installing at least one printing system thus constructed in a predetermined place; and (c) causing an expendables supply section to obtain a supply of expendables, which have been consumed by the printing system installed at the predetermined place, from the modules expendables production section and give the supply the expendables to the printing system.

In this method of managing production of printing systems and supply of expendables, the section of producing printer modules is different from the section of constructing the printing system. Selection of high-quality printer modules and high-quality system construction attains the higher-performance printing system. Still a different section takes charge of supply of expendables. This arrangement ensures adequate supply of expendables. The expendables (for example, printing ink and printing paper) consumed by the printer modules are produced by and supplied from the section of producing the printer modules as the genuine expendables suitable for the printer modules. This ensures sufficient execution of the performances of the ink jet printer. The system of multiple sections desirably reduces the quantity of data to be managed in each section, thus enhancing the processing speed and improving the reliability.

In accordance with one preferable application of the method of managing production of printing systems and supply of expendables according to the present invention, the printing system installed at the predetermined place is under management of maintenance by the system construction section. In this application, the printing system is under management of maintenance by the system construction section, which has produced the printing system, thus sufficiently exerting its performances.

In accordance with another preferable application of the method of managing production of printing systems and supply of expendables according to the present invention, the supply of the expendables by the expendables supply section is carried out based on a state of consumption of expendables, which is collected from the printing system installed at the predetermined place via communication. This arrangement ensures adequate management of supply of expendables.

In accordance with still another preferable application of the method of managing production of printing systems and supply of expendables according to the present invention, the expendables supply section outputs information on charging for the supply of expendables to the printing system, which has received the supply, via communication. This arrangement enables the information on charging for the supply of expendables to be output to the printing system without delay. In this application of the method of managing production of printing systems and supply of expendables according to the present invention, it is preferable that the information on charging is output via communication to a printing system, which includes a receipt printer under driving control of the computer, so as to cause the receipt printer to print the information on charging. This arrangement enables the information on charging to be printed with the receipt printer.

In the method of managing production of printing systems and supply of expendables according to the present invention, it is preferable that the production of expendables by the modules expendables production section is managed, based on the state of consumption of expendables collected from the printing system installed at the predetermined position via communication. This arrangement ensures production of expendables based on the production plan of exact quantities, while attaining adequate management of the stock.

In the method of managing production of printing systems and supply of expendables according to the present invention, it is also preferable that the production of expendables by the modules expendables production section is managed, based on the supply of expendables given to the predetermined place by the expendables supply section. This arrangement also ensures production of expendables based on the production plan of exact quantities, while attaining adequate management of the stock.

In the method of managing production of printing systems and supply of expendables according to the present invention, it is further preferable that the production of expendables by the modules expendables production section is managed, based on the acquisition of the supply of expendables by the expendables supply section. This arrangement also ensures production of expendables based on the production plan of exact quantities, while attaining adequate management of the stock.

In accordance with another preferable application of the method of managing production of printing systems and supply of expendables according to the present invention, the expendables supply section outputs information on the supply of expendables to the system construction section via communication. In this application, the system construction section performs appropriate maintenance of the printing system, based on the information on the supply of expendables.

DESCRIPTION OF THE PREFERRED EMBODIMENTS

Figure 1:
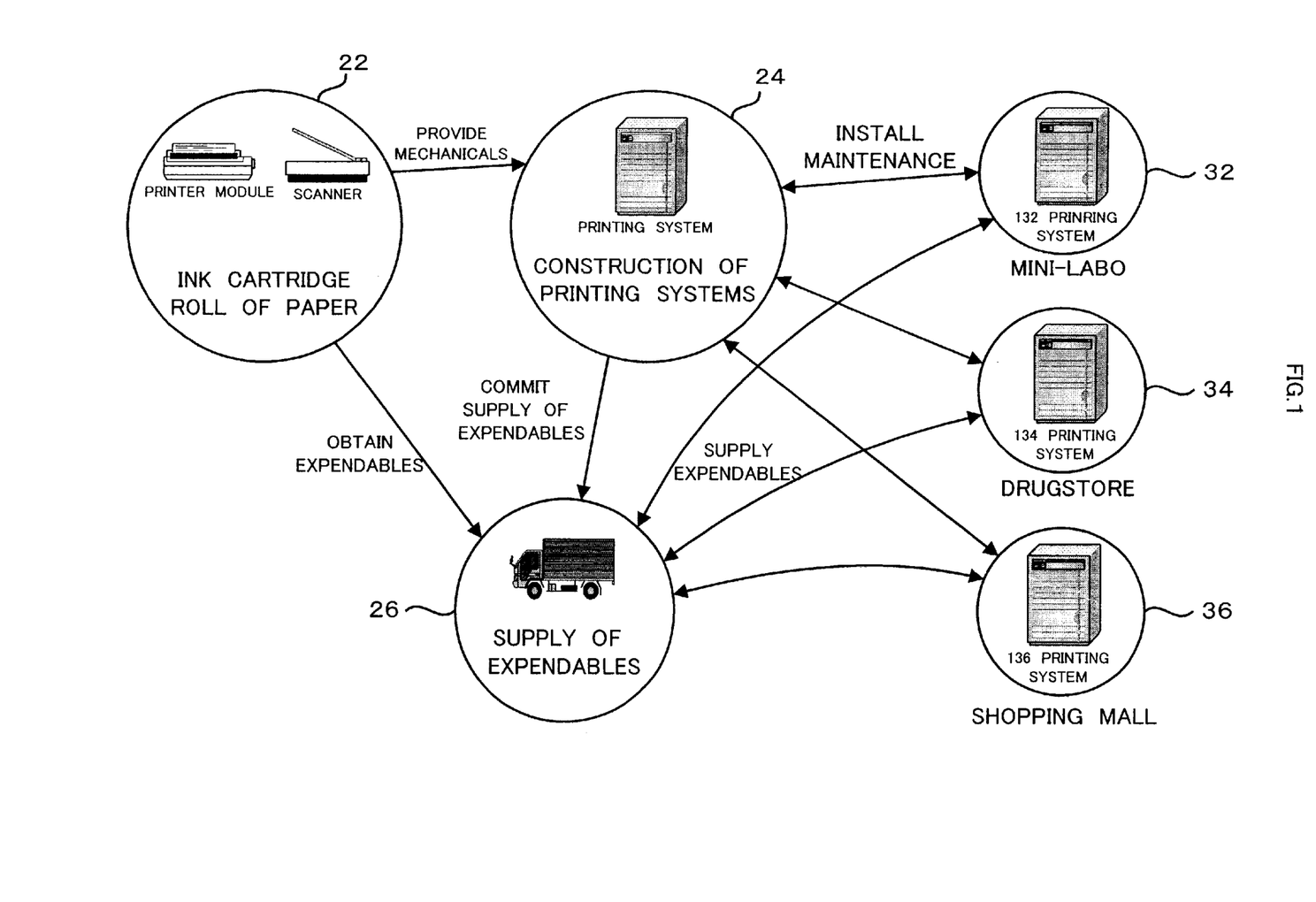
FIG. 1 shows the concept of a method of managing production of printing systems and supply of expendables in one embodiment of the present invention.
Figure 2:
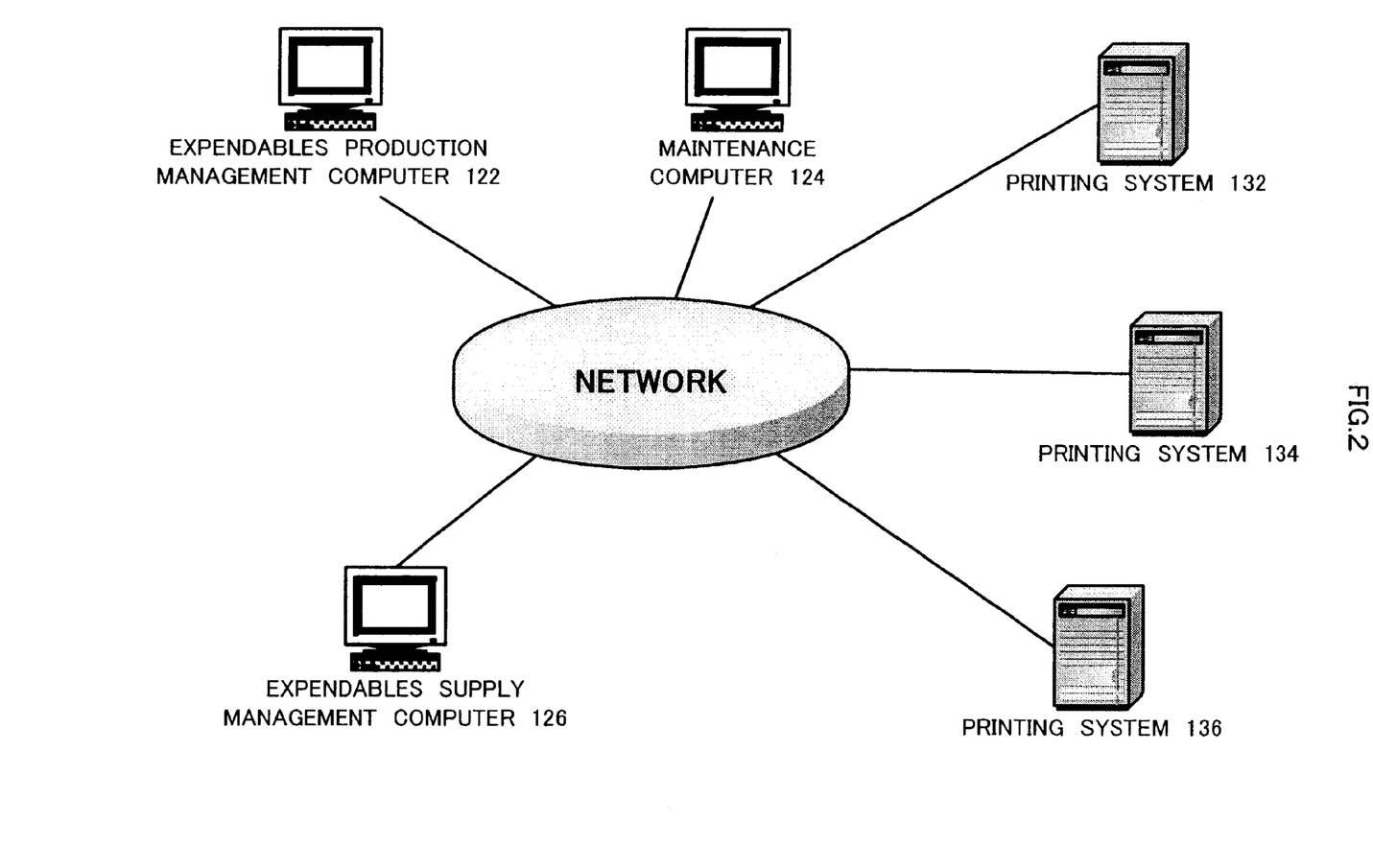
FIG. 2 schematically illustrates the configuration of a management system that manages maintenance of the printing systems of the embodiment and supply of expendables.

One mode of carrying out the present invention is discussed below as a preferred embodiment. FIG. 1 shows the concept of a method of managing production of printing systems and supply of expendables in one embodiment of the present invention. FIG. 2 schematically illustrates the configuration of a management system that manages maintenance of the printing systems of the embodiment and supply of expendables.

Referring to FIG. 1, a mechanicals expendables production section 22 produces and supplies mechanical modules like printer modules and scanners as built-in modules of ink jet printers, as well as expendables like ink cartridges and rolls of paper that are used to ensure sufficient execution of performances of the produced printer modules.

A system construction section 24 assembles the mechanical modules like printer modules and a scanner supplied from the mechanicals expendables production section 22 and a built-in computer for driving and controlling such mechanical modules to construct a printing system. The system construction section 24 installs constructed printing systems 132, 134, and 136 in a mini-labo 32, a drugstore 34, and a shopping mall 36 and carries out maintenance of the printing systems 132, 134, and 135. The system construction section 24 spends labor not for production of the mechanical modules but for construction of the system, thus ensuring construction of high-performance printing systems. In the printing system of the embodiment, a plurality of printer modules, a scanner, and a receipt printer are incorporated as mechanical modules. The built-in computer takes charge of driving and controlling such mechanical modules.

In response to a commission of supply of expendables from the system construction section 24, an expendables supply section 26 fetches the state of consumption of expendables like printing ink and printing paper consumed by the printing systems 132, 134, and 136 installed at the mini-labo 32, the drugstore 34, and the shopping mall 36, obtains required expendables from the mechanicals expendables production section 22, and supplies the expendables to the printing systems 132, 134, and 136. The supply of expendables is obtained from the mechanicals expendables production section 22, which produces genuine expendables suitable for the printer modules. This arrangement ensures sufficient execution of the printing performances of the printing system.

Referring to FIG. 2, a management system for managing the printing systems of the embodiment includes an expendables production management computer 122 installed in the mechanicals expendables production section 22, a maintenance computer 124 installed in the system construction section 24, an expendables supply management computer 126 installed in the expendables supply section 26, and built-in computers of the printing systems 132, 134, and 136 installed at the mini-labo 32, the drugstore 34, and the shopping mall 36, which are mutually connected via a network.

Figure 3:
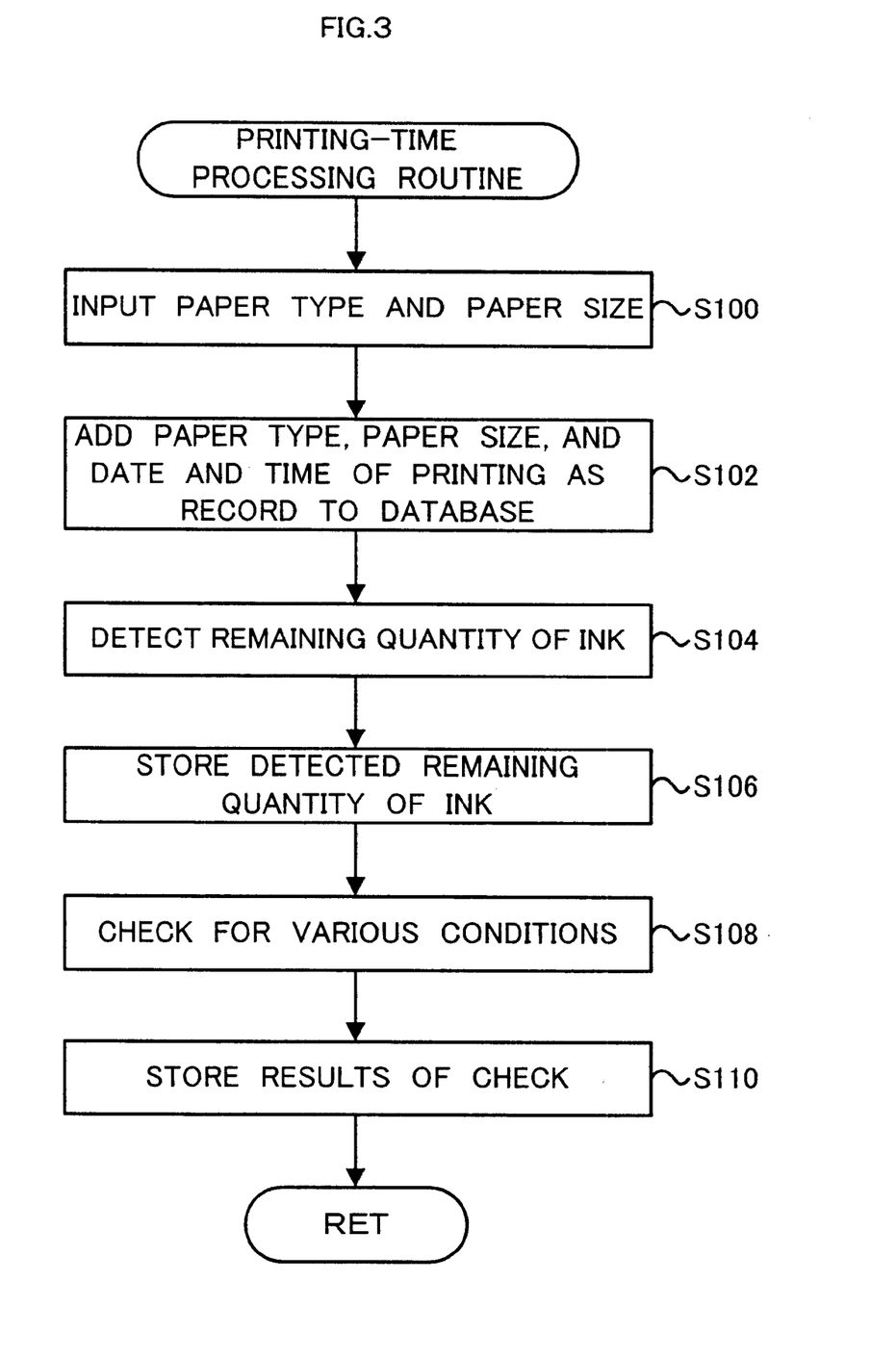
FIG. 3 is a flowchart showing a printing-time processing routine carried out by any of the built-in computers of printing systems 132, 134, and 136.

FIG. 3 is a flowchart showing a printing-time processing routine carried out by any of the built-in computers of the printing systems 132, 134, and 136. This routine is executed every time the printing operation is performed in any of the printing systems 132, 134, and 136. When the program enters the printing-time processing routine, any of the built-in computers of the printing systems 132, 134, and 136 inputs information on the type and the size of printing paper used for printing (step S100). The concrete procedure inputs the paper type and the paper size set by, for example, a user for printing. The built-in computer then adds the input information on the paper type, the paper size, and the date and time of printing as a record to a database established in a hard disk included in the computer as an external storage device (step S102). The computer detects a remaining quantity of each color ink left in an ink cartridge with a non-illustrated ink remain detection sensor (step S104) and stores the detected remaining quantity of ink into a preset area of a RAM (step S106). Here the remaining quantity of ink may be detected directly with a mechanical detection sensor, may be calculated from accumulated quantities of ink ejection in the printing process, or may be obtained from the software computation of the total quantity of consumption in cooperation with image processing. The computer subsequently checks for the various conditions of the printer modules and the scanner incorporated in the printing system (step S108) and stores information obtained as the results of the check into a preset area of the RAM (step S110). The program then exits from this processing routine. The various conditions include the driving state of each printer module for printing and the driving state of the scanner for reading. Each of the various conditions is stored as 'good' or 'no good'. The printing-time processing enables the printing systems 132, 134, and 136 to manage the printing-related data, the remaining quantities of inks, and the various conditions.

Figure 4:
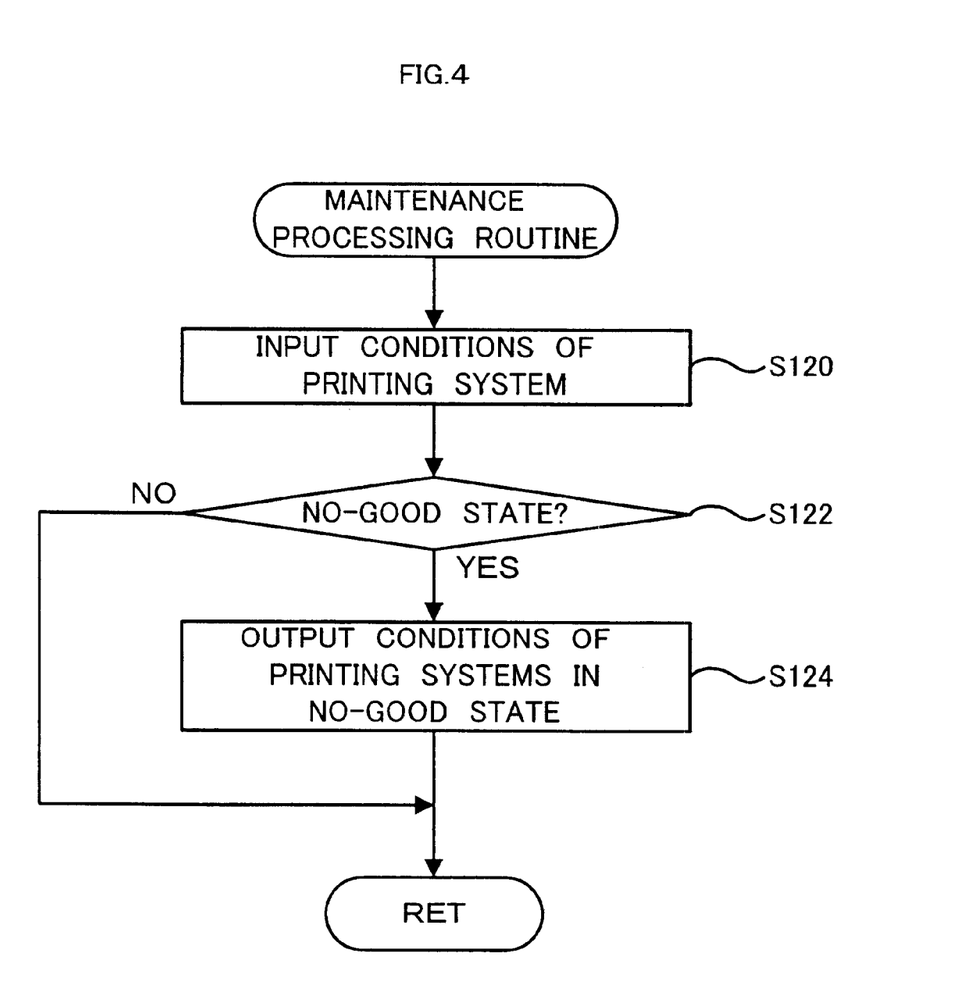
FIG. 4 is a flowchart showing a maintenance processing routine carried out by a maintenance computer 124 installed in a system construction section 24.

FIG. 4 is a flowchart showing a maintenance processing routine carried out by the maintenance computer 124 installed in the system construction section 24. This routine is repeatedly executed at predetermined time intervals (for example, every hour or every day). When the program enters this maintenance processing routine, the maintenance computer 124 first communicates with the built-in computers of the printing systems 132, 134, and 136 installed at the mini-labo 32, the drugstore 34, and the shopping mall 36 to input the various conditions of the printer modules and the scanners incorporated in the respective printing systems 132, 134, and 136 (step S120). When any of the conditions is 'no good' in any of the printing systems (step S122), the computer outputs the conditions of the printing system in the no-good state in an enumerative manner to the CRT or the printer of the printing system (step S124). The program then exits from this processing routine. Such maintenance processing implements maintenance of the printing system in the no-good state without delay, thus enabling each printing system to be continuously kept in the good state.

Figure 5:
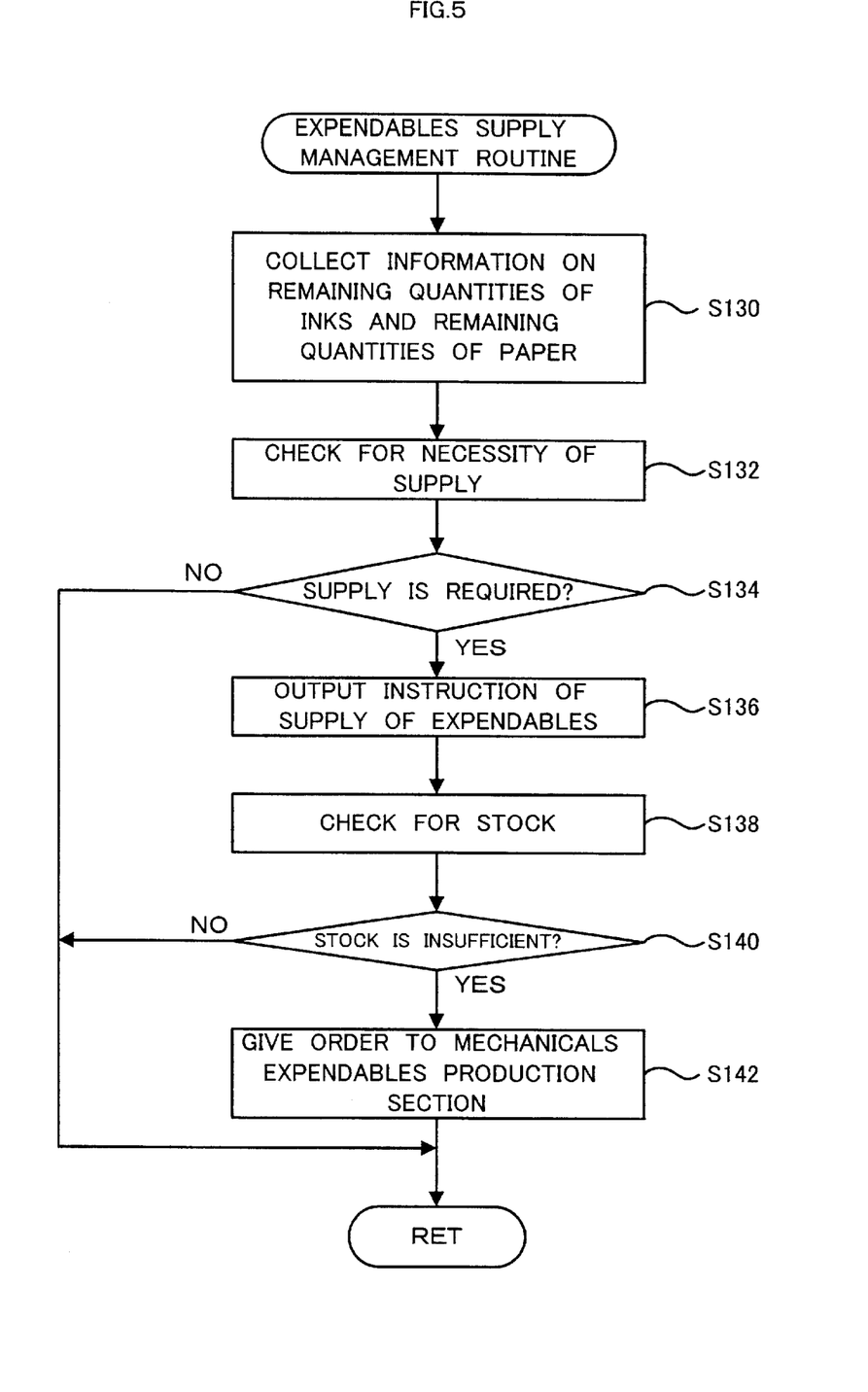
FIG. 5 is a flowchart showing an expendables supply management routine carried out by an expendables supply management computer 126 installed in an expendables supply section 26.

FIG. 5 is a flowchart showing an expendables supply management routine carried out by the expendables supply management computer 126 installed in the expendables supply section 26. This routine is repeatedly executed at predetermined time intervals (for example, every hour or everyday). When the program enters this expendables supply management routine, the expendables supply management computer 126 first communicates with the built-in computers of the printing systems 132, 134, and 136 installed at the mini-labo 32, the drugstore 34, and the shopping mall 36 to collect information on the remaining quantities of inks and the remaining quantities of printing paper (step S130). The procedure of this embodiment inputs the remaining quantities of printing paper, which are computed by the respective built-in computers of the printing systems 132, 134, and 136 based on the paper type and the paper size used for each printing operation. Another applicable procedure inputs data after previous supplies of printing paper from the databases established in the hard disks of the built-in computers of the respective printing systems 132, 134, and 136 and computes the remaining quantities of printing paper based on the input data.

After the input of the remaining quantities of inks and the remaining quantities of printing paper, the computer checks for the necessity of supply based on the input remaining quantities of inks and remaining quantities of printing paper (step S132). The procedure of this embodiment determines the necessity of supply when ink or printing paper has been consumed up to 80% of the full volume (that is, 20% as the remaining quantity). In the case of necessity of supply (step S134), the computer gives an instruction of supply of a required expendable to each printing system, which is determined to have necessity of supply (step S136). The instruction of supply is given by outputting a list of required expendables, which are to be supplied to each printing system having necessity of supply, to the CRT or the printer of the printing system. This series of processing effectively ensures timely supply of expendables required for each printing system, thus enabling the printing system to continuously work in the favorable conditions.

The computer then checks for stock of the expendables in the expendables supply section 26 (step S138), and gives an order of each expendable having an insufficient stock to the mechanicals expendables production section 22 (steps S140 and S142). The program then exits from this routine. This series of processing assures the adequate stock in the expendables supply section 26. The order of an ink cartridge or printing paper as the expendable having insufficient stock is given to the mechanicals expendables production section 22, which produces the genuine expendables suitable for the printer modules incorporated in the printing system. This arrangement ensures sufficient execution of the printing performances of the printing system.

Figure 6:
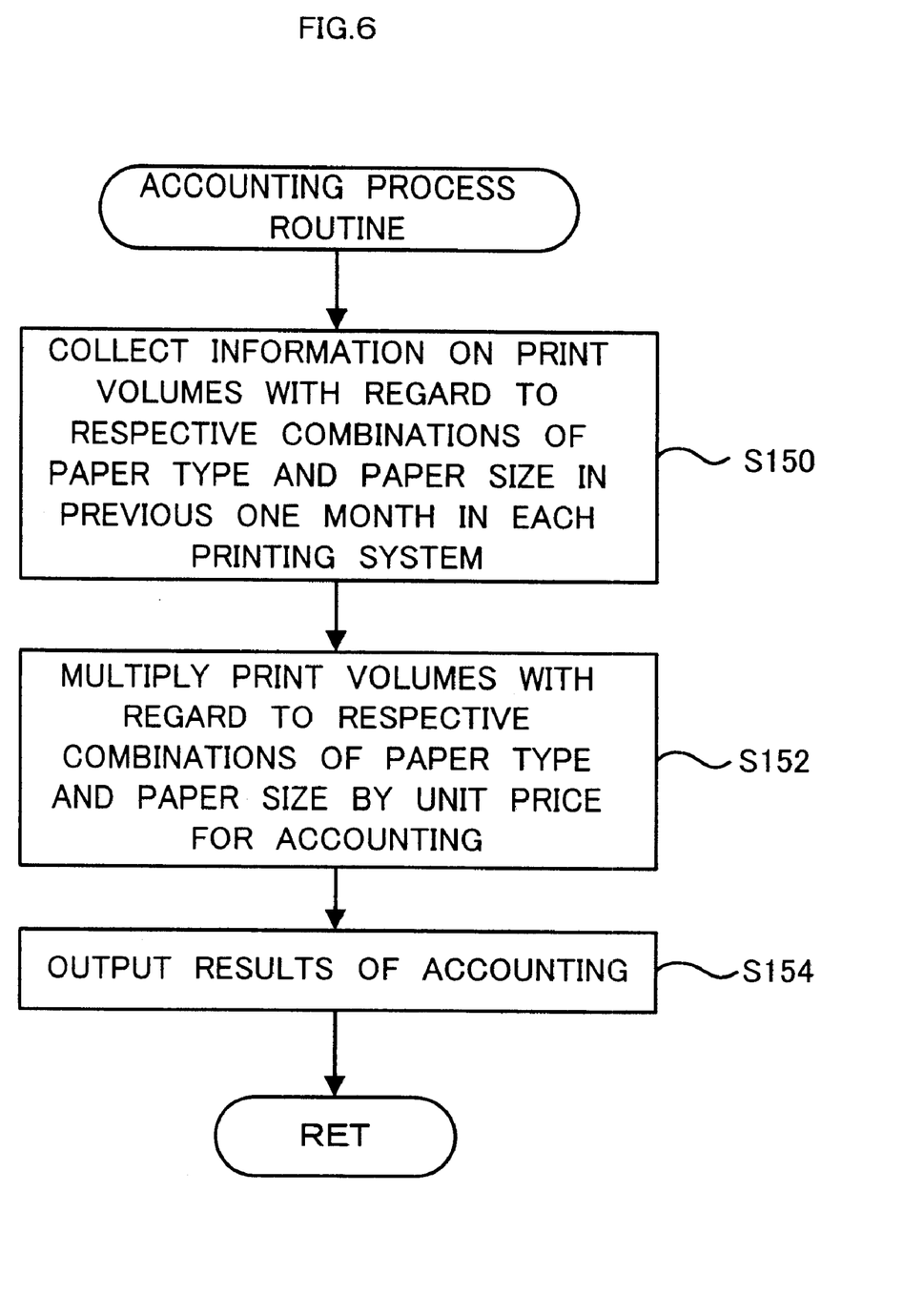
FIG. 6 is a flowchart showing an accounting process routine carried out by the expendables supply management computer 126 installed in the expendables supply section 26.

FIG. 6 is a flowchart showing an accounting process routine carried out by the expendables supply management computer 126 installed in the expendables supply section 26. This routine is executed at the beginning of every month. When the program enters this accounting process routine, the expendables supply management computer 126 first communicates with the built-in computers of the printing systems 132, 134, and 136 installed at the mini-labo 32, the drugstore 34, and the shopping mall 36 to collect information on the print volumes with regard to diverse combinations of paper type and paper size in previous one month in the respective printing systems 132, 134, and 136 (step S150). The computer then multiplies the print volumes with regard to the diverse combinations of paper type and paper size in previous one month in the respective printing systems 132, 134, and 136 by corresponding unit prices for accounting (step S152), and outputs the results of the accounting to the corresponding printing systems 132, 134, and 136 (step S154). The program then exits from this routine. Table 1 given below shows a list of accounting for the respective printing systems 132, 134, and 136. In the arrangement of this embodiment, the results of the accounting input into the built-in computers of the respective printing systems 132, 134, and 136 are printed with the receipt printer. The accounting process adequately charges for the expendables. The arrangement of setting the unit price to the print volume of every combination of paper type and paper size ensures adequate accounting.

| Printing System | Paper Type | Paper Size | Unit Price | Print Volume | Total Price |
|---|---|---|---|---|---|
| XXXXXXXX | Glossy PaperA | A4 | XXXXX | 150 | YYYYY |
| XXXXXXXX | Glossy PaperA | A3 | XXXXX | 70 | YYYYY |
| XXXXXXXX | Glossy PaperB | A4 | XXXXX | 130 | YYYYY |
| XXXXXXXX | Glossy PaperB | A3 | XXXXX | 60 | YYYYY |

Figure 7:
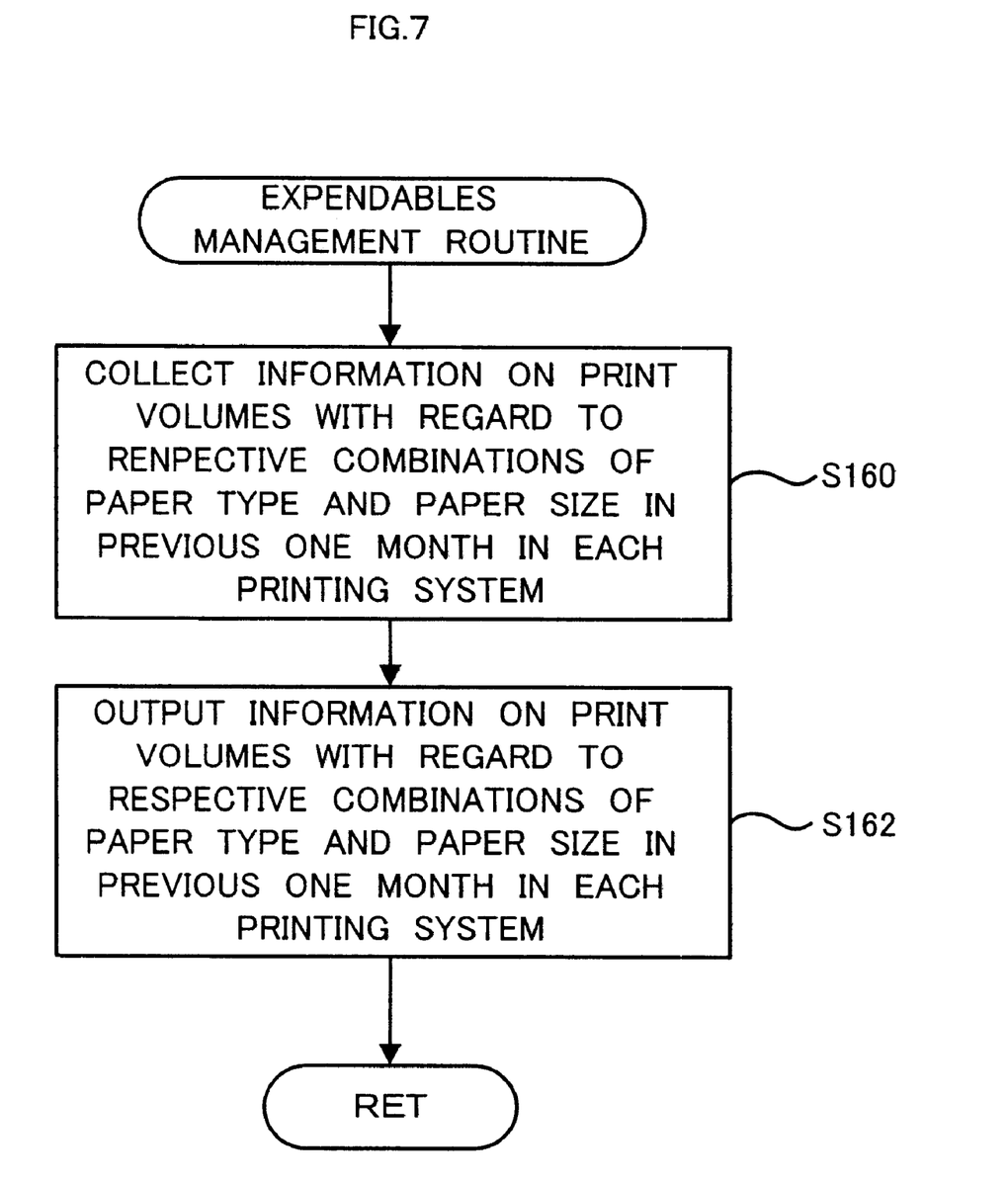
FIG. 7 is a flowchart showing an expendables management routine carried out by an expendables production management computer 122 installed in a mechanicals expendables production section 22 and by the maintenance computer 124 installed in the system construction section 24.

FIG. 7 is a flowchart showing an expendables management routine carried out by the expendables production management computer 122 installed in the mechanicals expendables production section 22 and by the maintenance computer 124 installed in the system construction section 24. This routine is executed at the beginning of every month. When the program enters the expendables management routine, the expendables production management computer 122 and the maintenance computer 124 first communicate with the built-in computers of the printing systems 132, 134, and 136 installed at the mini-labo 32, the drugstore 34, and the shopping mall 36 to collect information on the print volumes with regard to the diverse combinations of paper type and paper size in previous one month in the respective printing systems 132, 134, and 136 (step S160). The computer then outputs the collected information on the print volumes with regard to the diverse combinations of paper type and paper size in previous one month in the respective printing systems 132, 134, and 136 in an enumerative manner to the corresponding CRT or printer (step S162). The program then exits from this routine. This series of processing enables the mechanicals expendables production section 22 and the system production section 24 to grasp the information on the print volumes with regard to the diverse combinations of paper type and paper size in previous one month in the respective printing systems 132, 134, and 136. The mechanicals expendables production section 22 makes the results of the processing reflected on a production plan of expendables, thus ensuring production based on the adequate production plan of expendables. The system construction section 24 makes the results of the processing reflected on maintenance of the respective printing systems 132, 134, and 136, thus enabling the printing systems 132, 134, and 136 to be kept in the favorable conditions.

The above series of processing executed in the printing system ensures sufficient execution of the performances of the printing system, while enabling the printing system to be continuously kept in the favorable conditions and adequately supplying required expendables.

The procedure of the above embodiment executes all the printing-time process shown in FIG. 3, the maintenance process shown in FIG. 4, the expendables supply management process shown in FIG. 5, the accounting process shown in FIG. 6, and the expendables management process shown in FIG. 7. Any one or multiple processes selected among these processes may be omitted from the execution.

In the technique of managing the supply to the printing system in the embodiment, the expendables supply management computer 126 installed in the expendables supply section 26, which has received a commission from the system construction section 24, inputs the information on the remaining quantities of inks and the remaining quantities of printing paper from the built-in computers of the respective printing systems 132, 134, and 136 and determines the supply of expendables based on the input information on the remaining quantities of inks and the remaining quantities of printing paper. In one possible modification, the maintenance computer 124 installed in the system construction section 24 and the expendables production management computer 122 installed in the mechanicals expendables production sections 22 may input the information on the remaining quantities of inks and the remaining quantities of printing paper and determine the supply of expendables based on the input information. In the latter case, the maintenance computer 124 outputs an instruction of supply of expendables to the expendables supply management computer 126.

In the technique of managing production of printing systems and supply of expendables in the above embodiment, the mechanicals expendables production section 22, the system construction section 24, and the expendables supply section 26 share the roles. The mechanicals expendables production section 22, the system construction section 24, and the expendables supply section 26 may be actualized by an identical organization or company or by different organizations or companies.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A method of managing production of a printing system, which includes an ink jet printer and a computer, and supply of expendables, said method comprising the steps of:

causing a system construction section to construct said printing system by assembling at least one printer module supplied from a modules expendables production section, which produces a printer module including at least a head of said ink jet printer and expendables consumed by said printer module, and a computer that controls a printing operation of said at least one printer module;

installing at least one printing system thus constructed in a predetermined place; and causing an expendables supply section to obtain a supply of expendables, which have been consumed by said printing system installed at the predetermined place, from said modules expendables production section and give the supply the expendables to said printing system.

2. A method in accordance with claim 1, wherein the expendables include printing ink and printing paper.

3. A method in accordance with claim 1, wherein said printing system installed at the predetermined place is under management of maintenance by said system construction section.

4. A method in accordance with claim 1, in which the supply of the expendables by said expendables supply section is carried out based on a state of consumption of expendables, which is collected from said printing system installed at the predetermined place via communication.

5. A method in accordance with claims 1, wherein said expendables supply section outputs information on charging for the supply of expendables to said printing system, which has received the supply, via communication.

6. A method in accordance with claim 5, wherein the information on charging is output via communication to a printing system, which includes a receipt printer under driving control of said computer, so as to cause said receipt printer to print the information on charging.

7. A method in accordance with claim 1, wherein the production of expendables by said modules expendables production section is managed, based on the state of consumption of expendables collected from said printing system installed at the predetermined position via communication.

8. A method in accordance with claim 1, wherein the production of expendables by said modules expendables production section is managed, based on the supply of expendables given to the predetermined place by said expendables supply section.

9. A method in accordance with claim 1, wherein the production of expendables by said modules expendables production section is managed, based on the acquisition of the supply of expendables by said expendables supply section.

10. A method in accordance with claim 1, wherein said expendables supply section outputs information on the supply of expendables to said system construction section via communication.

11. A method of managing production of a printing system, which includes an ink jet printer and a computer, and supply of expendables, said method comprising the steps of:

causing a system construction section to construct said printing system by assembling at least one printer module supplied from a modules expendables production section, which produces a printer module including at least a head of said ink jet printer and expendables consumed by said printer module, and a computer that controls a printing operation of said at least one printer module;

installing at least one printing system thus constructed to be under management of maintenance by said system construction section in a predetermined place; and causing an expendables supply section to obtain a supply of expendables, which have been consumed by said printing system installed at the predetermined place, from said modules expendables production section and give the supply the expendables to said printing system based on a state of consumption of expendables, which is collected from said printing system via communication.

12. A method in accordance with claim 11, wherein the expendables include printing ink and printing paper.

13. A method in accordance with claim 11, wherein said expendables supply section outputs information on charging for the supply of expendables to said printing system, which has received the supply, via communication.

14. A method in accordance with claim 13, wherein the information on charging is output via communication to a printing system, which includes a receipt printer under driving control of said computer, so as to cause said receipt printer to print the information on charging.

15. A method in accordance with claim 11, wherein the production of expendables by said modules expendables production section is managed, based on the state of consumption of expendables collected from said printing system installed at the predetermined position via communication.

16. A method in accordance with claim 11, wherein the production of expendables by said modules expendables production section is managed, based on the supply of expendables given to the predetermined place by said expendables supply section.

17. A method in accordance with claim 11, wherein the production of expendables by said modules expendables production section is managed, based on the acquisition of the supply of expendables by said expendables supply section.

18. A method in accordance with claim 11, wherein said expendables supply section outputs information on the supply of expendables to said system construction section via communication.

* * * * *